(12) United States Patent  
Chen et al.

(10) Patent No.: US 8,832,131 B2  
(45) Date of Patent: Sep. 9, 2014

(54) SYSTEM, METHOD, AND APPARATUS FOR REPLICATING A PORTION OF A CONTENT REPOSITORY USING BEHAVIORAL PATTERNS

(75) Inventors: Feng-Wei Chen, Cary, NC (US); Michael T Donaghy, Raleigh, NC (US); William T Pack, Apex, NC (US); Nikhil Parekh, Raleigh, NC (US); Jacques-Marie Thrasybule, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 633 days.

(21) Appl. No.: 12/499,614

(22) Filed: Jul. 8, 2009

(65) Prior Publication Data

US 2011/0010342 A1    Jan. 13, 2011

(51) Int. Cl.  
*G06F 17/30* (2006.01)

(52) U.S. Cl.  
CPC ............................. *G06F 17/30174* (2013.01)  
USPC .......................... 707/760; 707/758; 707/769

(58) Field of Classification Search  
USPC .......................................... 707/760, 758, 769  
See application file for complete search history.

(56) References Cited

U.S. PATENT DOCUMENTS

| | | | |
|---|---|---|---|
| 5,130,924 A * | 7/1992 | Barker et al. | 715/205 |
| 6,374,237 B1 | 4/2002 | Reese | |
| 6,546,388 B1 | 4/2003 | Edlund et al. | |
| 6,766,316 B2 * | 7/2004 | Caudill et al. | 1/1 |
| 7,340,505 B2 * | 3/2008 | Lisiecki et al. | 709/217 |
| 7,496,914 B1 * | 2/2009 | Ling et al. | 717/178 |
| 7,685,140 B2 * | 3/2010 | Jackson | 707/999.1 |
| 7,693,812 B2 * | 4/2010 | Lim et al. | 707/999.001 |
| 2005/0234957 A1 * | 10/2005 | Olson et al. | 707/101 |
| 2005/0262246 A1 * | 11/2005 | Menon et al. | 709/226 |
| 2006/0036592 A1 * | 2/2006 | Das et al. | 707/4 |
| 2008/0172353 A1 * | 7/2008 | Lim et al. | 706/47 |
| 2008/0172360 A1 * | 7/2008 | Lim et al. | 707/3 |
| 2008/0181516 A1 * | 7/2008 | Jackson | 382/236 |
| 2009/0287657 A1 * | 11/2009 | Bennett | 707/3 |
| 2010/0005122 A1 * | 1/2010 | Jackson | 707/104.1 |
| 2010/0145986 A1 * | 6/2010 | Lim et al. | 707/769 |

* cited by examiner

*Primary Examiner* — Apu Mofiz  
*Assistant Examiner* — Jared Bibbee  
(74) *Attorney, Agent, or Firm* — Jeffrey T. Holman

(57) ABSTRACT

A computer-implemented method for selecting a portion of a content repository for replication including monitoring a usage pattern of a content repository, determining one or more preferred relationship patterns for replication in response to the usage pattern, identifying content items of the content repository matching the preferred relationship patterns, and selecting the identified content items of the content repository. Monitoring the usage pattern is performed by a pattern recognition engine operating on a computer. The content repository includes two or more content items. The relationship patterns are associated with an ontology describing relationships between content items in the content repository.

19 Claims, 5 Drawing Sheets

SYSTEM, METHOD, AND APPARATUS FOR REPLICATING A PORTION OF A CONTENT REPOSITORY USING BEHAVIORAL PATTERNS

BACKGROUND

Computer-based information sharing has become prevalent tool in many fields. Information stored in a content store may be accessed to provide information. Some content stores contain an enormous quantity of content items, and a user may use these content stores to answer questions, solve problems, and create solutions.

One example of a content store is a wiki. A wiki is a simple online database that allows users to collaboratively create a knowledge management system. In many wikis, users can create and edit content items within the wiki. The collaborative nature of the wiki often allows it to be accessed and modified by a large number of users. Consequently, the size of the content of the wiki can likewise become relatively large.

Large content stores containing prodigious amounts of information can be a great benefit to a user seeking an answer to a question or a solution to a problem. When the user has access to relatively high storage and/or network bandwidth, manipulation of a large content store is a trivial matter. However, when a user does not have relatively high storage capacity or network bandwidth, accessing a large content store can become problematic. For example, a consultant may be on a customer engagement in a location lacking Internet access. In another example, the data in the content store may be proprietary and inaccessible over the Internet, and a consultant on a customer engagement may therefore be unable to access the content store.

To address this problem, a user may replicate content items in the content store to a storage device to enable access to those particular content items. In the special case of the content store that is not particularly large, the entire content store may be replicated onto a storage device, such as a laptop hard drive. When the content store is relatively large, however, it may be impractical to replicate the entire content store to a portable storage device, and the user may attempt to replicate a limited number of content items to a storage device by selecting individual content items. This, however, introduces a new problem: determining which content items to select for replication. As the size of the content store becomes larger, determining which items to replicate becomes particularly problematic.

SUMMARY

Embodiments of a computer-implemented method for selecting a portion of a content repository for replication are described. In one embodiment, the computer-implemented method includes monitoring a usage pattern of a content repository, determining one or more preferred relationship patterns for replication in response to the usage pattern, identifying content items of the content repository matching the preferred relationship patterns, and selecting the identified content items of the content repository. Monitoring the usage pattern is performed by a pattern recognition engine operating on a computer. The content repository includes two or more content items. The relationship patterns are associated with an ontology describing relationships between content items in the content repository. Other embodiments of the computer-implemented method are also described.

Embodiments of a computer program product for replicating a portion of a content repository are also described. In one embodiment, the computer program product includes a computer useable storage medium to store a computer readable program. The computer readable program, when executed on a computer, causes the computer to perform operations including monitoring a usage pattern of a content repository, determining one or more preferred relationship patterns for replication in response to the usage pattern, and generating a query for the preferred relationship patterns. The operations also include processing the query against the content repository to identify content items of the content repository matching the preferred relationship patterns, extracting the identified content items, and storing the identified content items on a storage device. The content repository includes two or more content items. Other embodiments of the computer program product are also described.

Embodiments of a system are also described. In one embodiment, the system is a system for replicating a portion of a content repository. The system includes a content repository to store a plurality of content items, a pattern recognition engine, and a replication engine. The pattern recognition engine includes a navigation monitor, a statistics generator, an ontology manager, and an ontological graph builder. The navigation monitor monitors a usage pattern of the content repository. The statistics generator determines commonly accessed content items and commonly used ontological relationships for a class of user. The ontology manager determines ontological classes for the commonly accessed content items. The ontological graph builder generates an ontological graph of content items to replicate including a subset of the plurality of content items. The replication engine extracts the identified content items and stores the identified content items on a storage device. Other embodiments of the system are also described.

Embodiments of an apparatus for replicating a portion of a content repository are also described. The apparatus includes a navigation monitor, a statistics generator, an ontology manager, and an ontological graph builder. The navigation monitor monitors a usage pattern of the content repository. The statistics generator determines commonly accessed content items and commonly used ontological relationships for a class of user. The ontology manager determines ontological classes for the commonly accessed content items. The ontological graph builder generates an ontological graph of content items to replicate including a subset of the plurality of content items. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
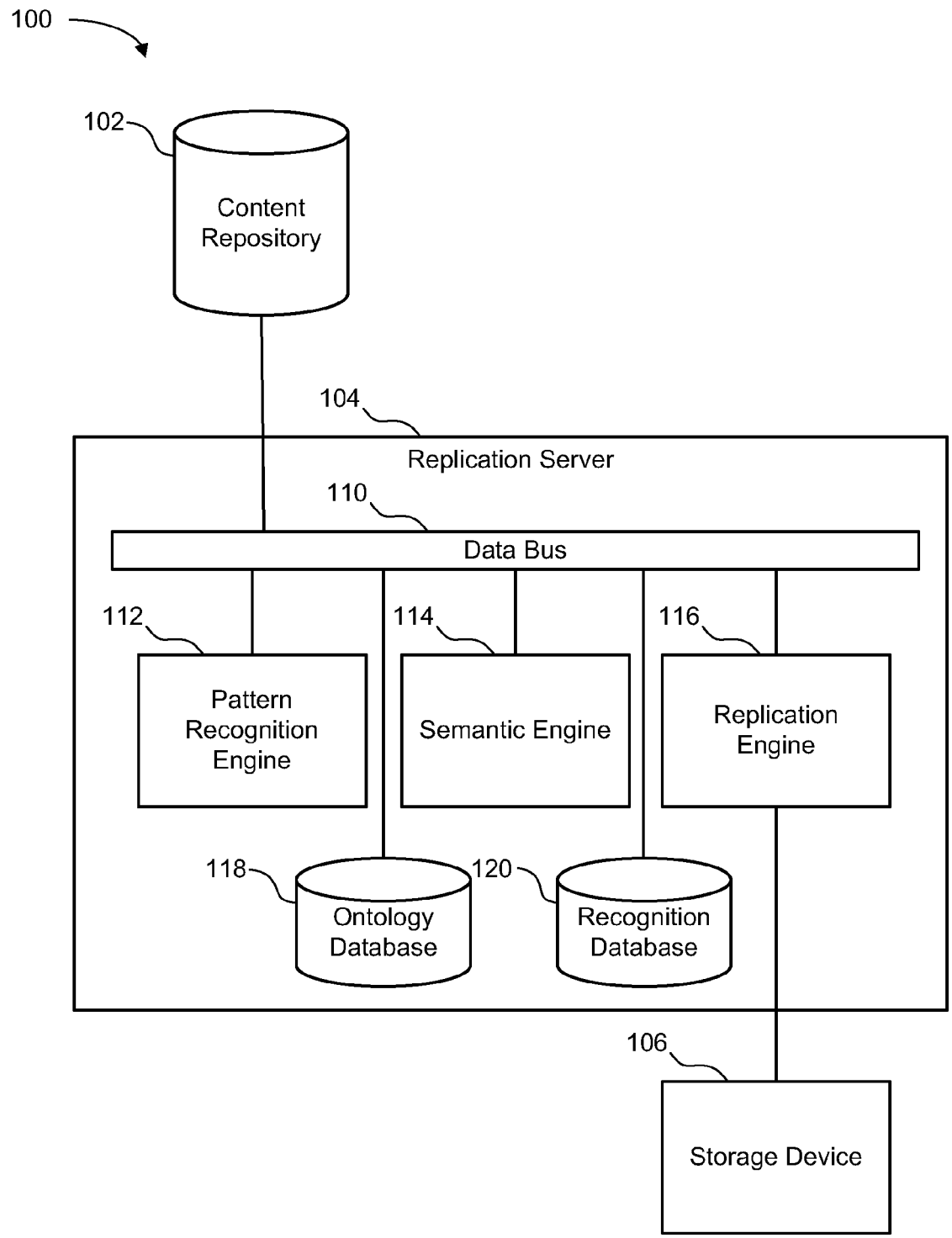
FIG. 1 depicts a schematic diagram of one embodiment of a system for replicating a portion of a content repository using behavioral patterns.

FIG. 1 depicts a schematic diagram of one embodiment of a system 100 for replicating a portion of a content repository 102 using behavioral patterns. The system 100 includes a content repository 102, a replication server 104, and a storage device 106. The system 100 selects content items in the content repository 102 for replication based on ontological relationships between content items in the content repository 102 and usage patterns for one or more users accessing the content repository 102.

The content repository 102, in one embodiment, contains a plurality of content items. The content repository 102 may be any type of content repository 102 capable of storing content items. For example, the content repository 102 may be a database referencing a plurality of digital documents. An example of a content repository 102 is a wiki-based collaborative system.

The content repository 102 may operate on one or more computer systems separate from other components in the system 100. For example, the content repository 102 may operate on a wiki server computer (not shown) separate from the replication server 104. In an alternative embodiment, the content repository 102 operates at least in part on the same computer system as another component in the system 100. For example, the content repository 102 may operate on the replication server 104.

In certain embodiments, the content repository 102 is accessed over a network (not shown). For example, the content repository 102 may be accessible over the Internet. In an alternative embodiment, the content repository 102 is in direct communication with another component of the system 100. For example, the content repository 102 may be directly connected to an element of the replication server 104.

The content repository 102 may be a content repository 102 related to a product. For example, the content repository may describe a product and contain content items relating to that product. The content items relating to the product may be of many types, including, but not limited to, marketing documents, training documents, help documents, and technical information.

In some embodiments, the content repository 102 includes a collaboration mechanism (not shown). The collaboration mechanism allows a plurality of users to collaborate to create and/or maintain content items in the content repository 102. In certain embodiments, the collaboration mechanism allows a plurality of users to create and/or maintain relationships between the content items in the content repository 102. The collaboration mechanism may be a social network. Examples of collaboration mechanisms include, but are not limited to, a social structure of individuals and organizations, email, instant messaging, wikis, weblogs (blogs), media sharing, such as audio, picture, and video sharing, collaborative tagging and subject indexing, and an avatar-based virtual world.

In one embodiment, the replication server 104 determines content items in the content repository 102 to replicate based on the usage patterns of one or more users. The replication server 104 includes a data bus 110, a pattern recognition engine 112, a semantic engine 114, and a replication engine 116. The replication server 104 determines which content items are most often used by a user of a particular group and selects those content items for replication.

The replication server 104 may be any type of computer capable of operating the components of replication server 104. For example, the replication server may be a server system operating in a data center (not shown). In an alternative embodiment, the replication server 104 includes one or more other components of the system 100. For example, the replication server 104 may include the content repository 102.

The data bus 110, in one embodiment, provides a data pathway for communication between components of the replication server 104 and other components of the system 100. The data bus 110 may include any type of device capable of communicating digital data. The data bus 110 may include or be a combination of an internal bus, an external bus, a serial bus, a parallel bus, a network connection, a peripheral bus, or another type of data communication system. In some embodiments, at least part of the data bus 110 is implemented in software.

The pattern recognition engine 112, in one embodiment, monitors user and/or group usage of content items in the content repository 102 to ascertain a usage pattern. The usage pattern describes which content items and relationships between content items are most frequently used by a user and/or a group of users. The pattern recognition engine 112 determines one or more preferred relationship patterns for replication in response to the usage pattern. The preferred relationship patterns are used by the pattern recognition engine 112 to generate an ontological graph that describes content items in the content repository 102 for replication. The pattern recognition engine 112 is described in greater detail in relation to FIG. 2 below.

In one embodiment, the semantic engine 114 stores and manages relationships between content items in the content repository 102. In some embodiments, the semantic engine 114 manages an ontology that describes one or more relationships between content items in the content repository 102. The ontology is a data model describing a domain of content items in the content repository 102 and relationships between those content items. For example, the content repository 102 may include a first content item and a second content item. The semantic engine 114 may manage an ontology that indicates that the first content item contains the second content item.

The semantic engine 114 may describe any type of relationship between two or more content items. Examples of relationships that the semantic engine 114 may describe include, but are not limited to, contains, drives, chooses, consists of, deploys to, recommends, provides, is supported by, is described by, is a help document for, and is a product description of. The semantic engine 114 may also include any other type of possible relationship between two content items. In some embodiments, the semantic engine 114 allows a user to define a type of relationship that may exist between two or more content items.

In one embodiment, the ontology managed by the semantic engine 114 is created via manual input by one or more users. For example, users may indicate one or more relationships over time as the content repository 102 is accessed by users. In another example, one or more administrators define relationships between content items to create the ontology.

In some embodiments, the semantic engine 114 generates ontological relationships between content items based on the usage pattern. For example, the pattern recognition engine 112 may determine that a user of a particular group that accesses a first content item frequently accesses a second content item. The semantic engine 114 in this example may create an association between the first and second content items indicating that the second content item is frequently accessed in response to the first content item being accessed.

The semantic engine 114, in one embodiment, accesses an ontology database 118. The ontology database 118 maintains short statements that describe the relationships between content items in the content repository. For example, the ontology database 118 may be a triplestore containing resource description framework (RDF) metadata.

In some embodiments, the ontology database 118 is accessed using a query. The query used to access the ontology database 118 may be any type of query capable of being processed against the ontology database 118. For example, the ontology database 118 may be a triplestore, and the query may be a SPARQL Protocol and RDF Query Language (SPARQL) query. The query may include triple patterns, conjunctions, disjunctions, and optional patterns. In another example, the ontology database 118 may be a relational database, and the query may be a structured query language (SQL) query.

In an alternative embodiment, the ontology is stored in one or more tags associated with content items in the content repository 102. For example, a content item in the content repository 102 may include a tag indicating that the content item is related to another content item. The tag may also indicate the type of relationship between the content items. The semantic engine 114 accesses the tags by accessing the content repository 102.

In one embodiment, the replication engine 116 receives an output from the pattern recognition engine 112 indicating selected content items in the content repository 102. The replication engine 116 replicates the selected content items from the content repository 102 to the storage device 108.

A recognition database 120, in one embodiment, stores a record of activities by one or more users relating to content items in the content repository 102. The recognition database 120 receives information relating to user activity from the pattern recognition engine 112. The recognition database 120 may be any type of database capable of storing activity information. For example, the recognition database 120 may be an SQL database.

The storage device 108, in one embodiment, stores the content items indicated by the replication engine 116. The storage device 108 may be any type of storage device capable of storing content items. In some embodiments, the storage device is a portable storage device. For example, the storage device 108 may be a hard drive on a laptop computer. In another example, the storage device 108 may be a flash drive.

Figure 2:
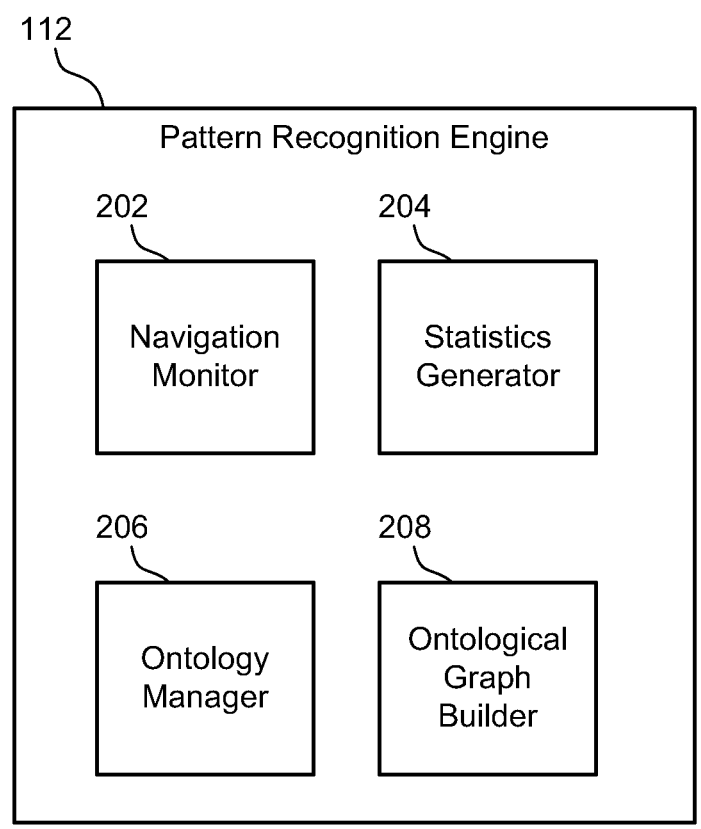
FIG. 2 depicts a schematic diagram of one embodiment of the pattern recognition engine of FIG. 1.

FIG. 2 depicts a schematic diagram of one embodiment of the pattern recognition engine 112 of FIG. 1. The pattern recognition engine 112 includes a navigation monitor 202, a statistics generator 204, an ontology manager 206, and an ontological graph builder 208. The pattern recognition engine 112 monitors content item usage and user and/or community behavior. The pattern recognition engine 112 uses the monitored usage patterns to map the behavior of a user or group of users to a set of frequently used ontological relationships or ontological pattern.

The navigation monitor 202, in one embodiment, monitors addresses of content items and navigation paths to content items based on users and groups. For example, the content repository 102 may be a wiki-based collaborative website and the content items in the wiki may be web pages. A first user may navigate from a first page to a second page to a third page in the wiki, while a second user may navigate from the first page to a fourth page to the third page in the wiki. The navigation monitor 202 monitors this activity and stores a record of the activity in the recognition database 120.

In one embodiment, the statistics generator 204 identifies content items a user or class of users are most statistically likely to access. This statistical information is used by the pattern recognition engine 112 to determine content items for replication. For example, a first user may navigate through a wiki from a first page to a second page to a third page ninety percent of the time, while navigating other paths the remaining ten percent of the time. The statistics generator 204 records this usage information in the recognition database 120 and communicates the usage information to other components of the pattern recognition engine 112.

The ontology manager 206, in one embodiment, associates or maps content items to ontological classes. Additionally, the ontology manager 206 returns possible relationships between ontological classes. For instance, the content item may describe a product, and the content item may have an include, a prerequisite, and a bundle relationship with another content item describing another product. In this example, the ontology manager 206 returns the include, prerequisite, and bundle relationships.

In one embodiment, the ontological graph builder 208 aggregates and consolidates the graph relationship to produce an ontological graph describing the content items to be replicated. The ontological graph builder 208 determines if any content items in the ontological graph are redundant and removes redundant content items. Consequently, the ontological graph builder 208 produces a unified ontological graph.

Figure 3:
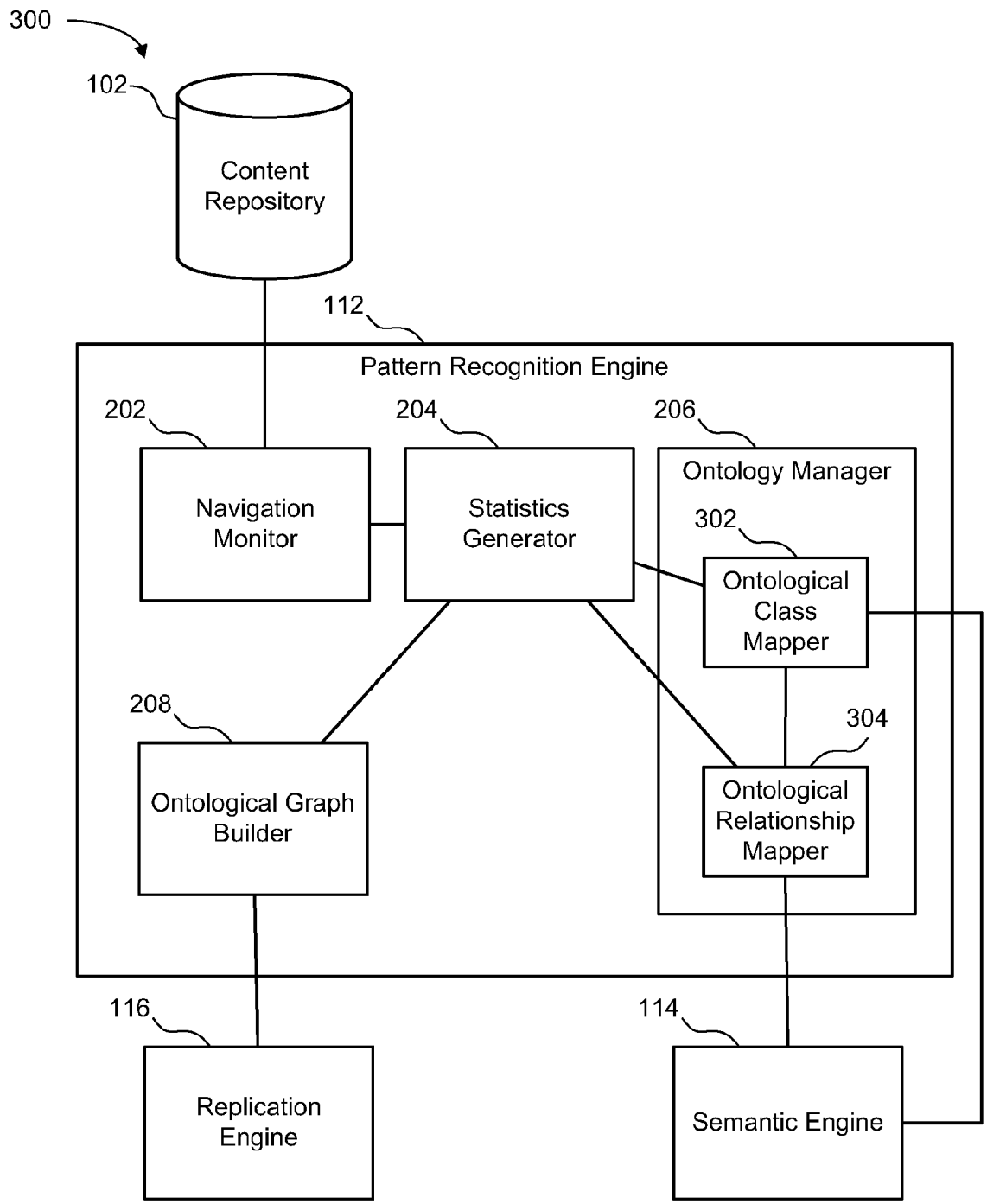
FIG. 3 depicts a schematic diagram of one embodiment of a workflow for the system of FIG. 1.

FIG. 3 depicts a schematic diagram of one embodiment of a workflow 300 for the system 100 of FIG. 1. In the workflow 300, the navigation monitor 202 tracks access to content items by individual users or groups of users. In some embodiments, the navigation monitor 202 monitors a sequence of access to content items. The navigation monitor 202 may store an address for the content item along with a relationship name. For example, the navigation monitor 202 may store a uniform resource identifier (URI) for a content item and a name describing the relationship between the content item and a second content item. The navigation monitor 202 stores the navigation information, including access to content items, user information, addresses, and relationships, in the recognition database 120.

In one embodiment, the navigation monitor 202 receives a replication request. In response to a replication request, the navigation monitor 202 accesses the statistics generator 204 to identify content items most likely to be returned. The statistics generator 204 generates references to the content items most likely to be returned based on statistics generated from the recognition database 120. The references to the content items most likely to be returned are passed to the ontology manager 206 for further processing.

In one embodiment, the ontology manager 206 includes an ontological class mapper 302 and an ontological relationship mapper 304. The ontological class mapper 302 uses the content item references from the statistics generator 204 to generate a query to determine ontological classes for the content items. The query is submitted to the semantic engine 114.

The semantic engine 114 processes the query from the ontological class mapper 302. The semantic engine 114 determines ontological classes for the content items based on the ontology. The ontological classes for the content items are returned to the ontological class mapper 302.

The ontological class mapper 302, in one embodiment, generates a map of ontological classes for the content items and submits the map to the ontological relationship mapper 304. The ontological relationship mapper 304 generates a query to retrieve the relationships between the classes in the map. The query is submitted to the semantic engine 114 for processing.

The semantic engine 114, in some embodiments, processes the query from the ontological relationship mapper 304. The semantic engine 114 determines the relationships between classes for the map. The relationships are returned to the ontological relationship mapper 304.

The ontological relationship mapper 304 receives and analyzes the relationships. If the relationships include more than one relationship between the same content items, the ontological relationship manager 304 accesses the statistics generator 204 to determine a more significant relationship class. For example, a first content item may be related to a second content item by an include, a prerequisite, and a bundle relationship. The statistics generator 204 may indicate that the user is most likely to access a content item related by a bundle relationship. The preferred relationship patterns are submitted to the ontological graph builder 208.

The ontological graph builder 208 receives the preferred relationships, the map of ontological classes, and the content items most likely to be returned and generates an ontological graph. The ontological graph describes a set of content items and relationships for replication. The ontological graph is submitted to the replication engine 116, which replicates the content items indicated by the ontological graph and stores the content items on a storage device 108.

Figure 4:
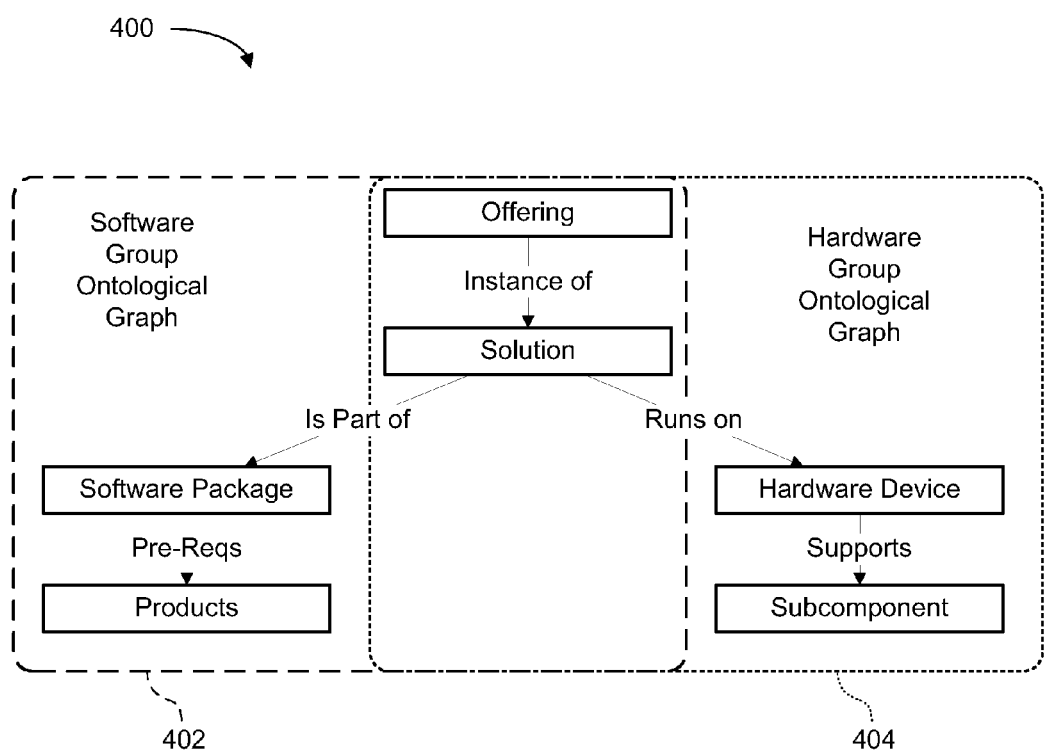
FIG. 4 depicts a schematic diagram of one embodiment of a method for selecting content items from a content repository for replication using behavioral patterns.

FIG. 4 depicts a schematic diagram of one embodiment of a method 400 for selecting content items from a content repository 102 for replication using behavioral patterns. FIG. 4 depicts a group of content items indicated by rectangular boxes and relationships between the content items indicated by lines with arrows. The relationships depicted by lines with arrows also include a word indicating the type of relationship between the content items.

In the method 400, a content item is selected. For example, the selected content item may be the content item labeled "offering." The selected content item represents a starting point for determining content items to replicate.

The navigation monitor 202 monitors access patterns for users and groups of users over time. In response to a replication request, the pattern recognition engine 112 uses the data gathered by the navigation monitor to determine preferred relationship patterns for replication.

In some embodiments, the replication request indicates that content items are to be replicated for a particular user belonging to a particular group. The pattern recognition engine 112 generates an ontological graph based on a usage pattern for a class of user, such as the individual user or a group to which the user belongs. For example, the user requesting replication may be a hardware engineer belonging to a hardware group. In this example, the pattern recognition engine 112 produces a hardware group ontological graph 404 based on activity by users in the hardware group. Similarly, the pattern recognition engine 112 produces a software group ontological graph 402 based on activity by users in a software group.

The pattern recognition engine 112 may indicate that a particular class of relationship is a preferred relationship pattern. For example, statistics based on usage by the software group may indicate that the relationship, "is part of," is traversed by members of the software group more often than the relationship, "runs on." In this case, the relationship, "is part of" is marked as a preferred relationship pattern.

The software group ontological graph 402 represents content items most likely to be accessed by a member of the software group based on historical usage patterns by members of the software group. By replicating the software group ontological graph 402 to a portable device, a member of the software group can carry a portable, relatively compact version of the content repository 102 with the content items he or she is most likely to access.

Similarly, the hardware group ontological graph 404 represents content items most likely to be accessed by a member of the hardware group based on historical usage patterns by members of the hardware group. By replicating the hardware group ontological graph 404 to a portable device, a member of the hardware group can carry a portable, relatively compact version of the content repository 102 with the content items he or she is most likely to access.

Figure 5:
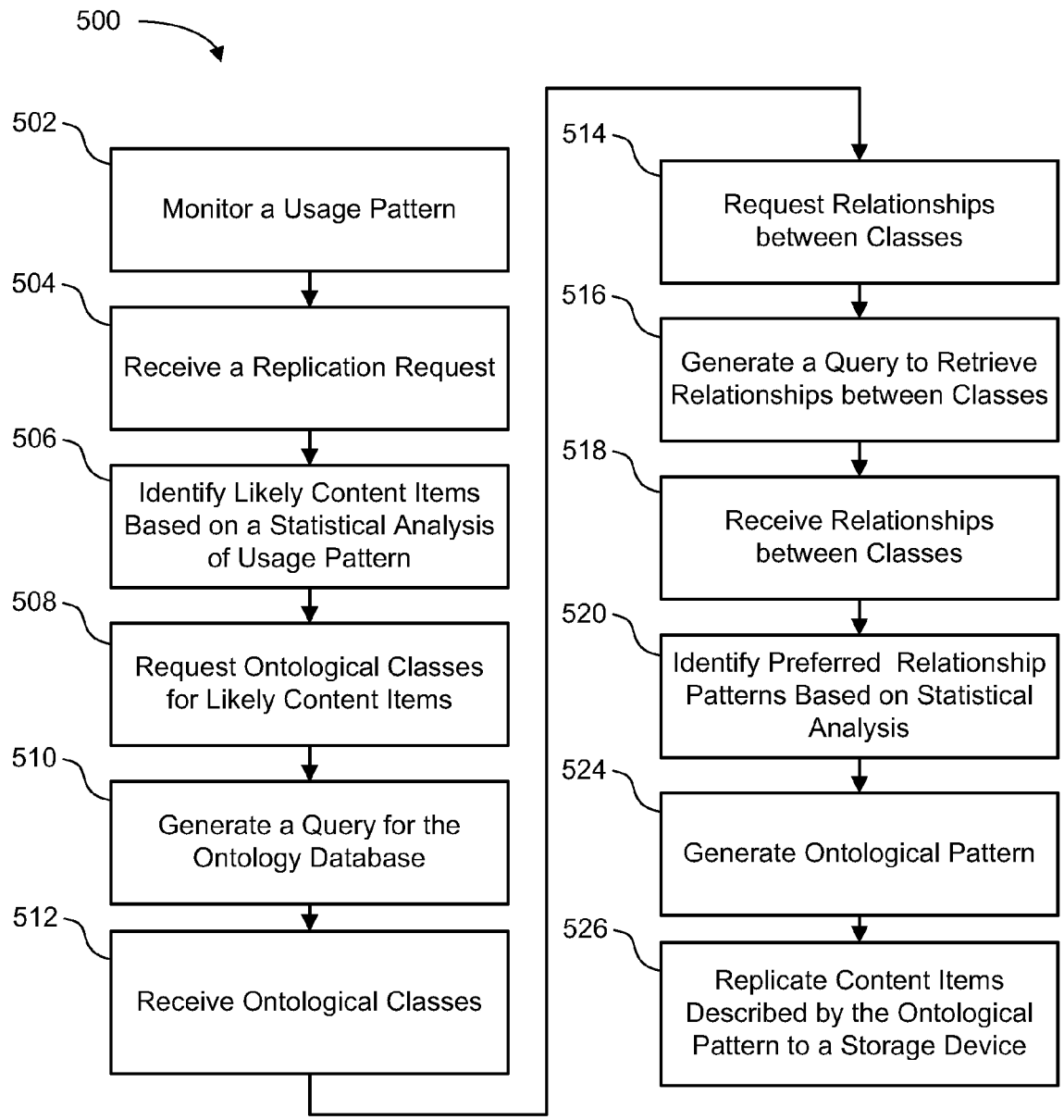
FIG. 5 is a flowchart diagram depicting one embodiment of a method for replicating a portion of a content repository using behavioral patterns.

FIG. 5 is a flowchart diagram depicting one embodiment of a method 500 for replicating a portion of a content repository 102 using behavioral patterns. The navigation monitor 202 monitors 502 usage patterns. Usage patterns monitored 502 by the navigation monitor include, but are not limited to, usage by an individual user, usage by a group of users associated by a characteristic, content item addresses, relationships between accessed content items, and content item access sequences.

The pattern recognition engine 112 receives 504 a replication request. In some embodiments, the replication request identifies one or more of a user, a group to which the user belongs, a starting content item, and a maximum allowable cumulative size for replicated content items. In one embodiment, the replication request indicates a maximum number of transitive relationships to honor in determining replicated content items. For example, the replication request may indicate that content items more than ten transitive steps away from the starting content item should not be replicated.

The statistics generator 204 accesses the recognition database 120 to identify 506 likely content items for replication based on a statistical analysis of the usage pattern generated by the navigation monitor 202. The likely content items for replication may include a predetermined number of content items. In some embodiments, the predetermined number of content items is based on the maximum allowable cumulative size for replicated content items.

The statistics generator 204 requests 508 ontological classes for the likely content items from ontological class mapper 302. The ontological class mapper 302 generates 510 a query for the ontology database 118. The query is processed against the ontology database 118 by the semantic engine 114 which returns ontological classes for the likely content items.

The ontological class mapper 302 receives 512 the ontological classes and requests 514 a determination of relationships between the ontological classes from the ontological relationship mapper 304. The ontological relationship mapper 304 generates 516 a query to retrieve the relationships between the ontological classes. The query is submitted to the semantic engine 114 for processing against the ontology database 118.

The semantic engine 114 returns the relationships between the ontological classes. The ontological relationship mapper 304 receives 518 the relationships between the ontological classes. If multiple ontological classes relate two content items, the ontological relationship manager 204 accesses the statistics generator 204 to identify 520 a preferred relationship based on a statistical analysis of usage patterns. For example, in choosing between two relationship patterns, the statistics generator 204 may indicate that users belonging to a group to which the user requesting replication belongs are more likely to follow the first relationship pattern. In this example, the first relationship pattern is identified as the preferred relationship pattern.

The ontological classes, relationships, and content item references are transmitted to the ontological graph builder

208. The ontological graph builder 208 generates 524 an ontological pattern representing an ontological graph. The ontological pattern represents the items to be replicated. The ontological pattern is submitted to the replication engine 116 which replicates 526 the content items referenced by the ontological pattern.

It should also be noted that at least some of the operations for the methods may be implemented using software instructions stored on a computer useable storage medium for execution by a computer. As an example, an embodiment of a computer program product for replicating a portion of a content repository includes operations for monitoring a usage pattern of a content repository, determining one or more preferred relationship patterns for replication in response to the usage pattern, and generating a query for the preferred relationship patterns. The operations also include processing the query against the content repository to identify content items of the content repository matching the preferred relationship patterns, extracting the identified content items, and storing the identified content items on a storage device. The content repository includes two or more content items.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for selecting a portion of a content repository for replication, comprising: monitoring, at a pattern recognition engine operating on a computer, a usage pattern of a content repository, the content repository including a plurality of content items, wherein the content items comprise digital documents, wherein the usage pattern describes usage of the digital documents in the content repository and logical relationships between the digital documents; determining one or more preferred relationship patterns for replication in response to the usage pattern and based on the logical relationships described by the usage pattern, the relationship patterns associated with an ontology describing relationships between content items in the content repository, wherein determining the one or more desired relationship patterns includes a statistical analysis of the usage pattern; automatically generating a query for the preferred relationship patterns to identify content items of the content repository matching the preferred relationship patterns; and selecting the identified content items of the content repository to replicate to a storage device separate from the content repository.

2. The computer-implemented method of claim 1, further comprising extracting the identified content items and storing the identified content items on the storage device.

3. The computer-implemented method of claim 2, wherein the storage device is a portable storage device.

4. The computer-implemented method of claim 1, wherein the usage pattern is related to a user of the content repository.

5. The computer-implemented method of claim 1, wherein the usage pattern is related to a group of users of the content repository, wherein each user within the group of users has a shared characteristic.

6. The computer-implemented method of claim 1, wherein the usage pattern is mapped to a class of ontological relationship of the ontology.

7. The computer-implemented method of claim 1, wherein the usage pattern is mapped to a type of content item in the content repository, the ontology including a class of relationship for one or more content items.

8. The computer-implemented method of claim 1, wherein the statistical analysis determines a more significant relationship class between two content items having two classes of relationships, the determination based on the usage pattern.

9. The computer-implemented method of claim 8, wherein the more significant relationship class is the relationship class more commonly followed in the usage pattern by a user requesting replication.

10. The computer-implemented method of claim 8, wherein the more significant relationship class is the relationship class more commonly followed in the usage pattern by a group to which a user requesting replication belongs.

11. The computer-implemented method of claim 1, further comprising receiving a maximum number of allowed transitive steps for selected content items.

12. A computer program product comprising a computer useable storage medium to store a computer readable program, wherein the computer readable program, when executed on a computer, causes the computer to perform operations for replicating a portion of a content repository, the operations comprising: monitoring a usage pattern of a content repository, the content repository including a plurality of content items, wherein the content items comprise digital documents, wherein the usage pattern describes usage of the digital documents in the content repository and logical relationships between the digital documents; determining one or more preferred relationship patterns for replication in response to the usage pattern and based on the logical relationships described by the usage pattern, the relationship patterns associated with an ontology describing relationships between content items in the content repository, wherein determining the one or more desired relationship patterns includes a statistical analysis of the usage pattern; automatically generating a query for the preferred relationship patterns; processing the query against the content repository to identify content items of the content repository matching the preferred relationship patterns; extracting the identified content items; and storing the identified content items on a storage device separate from the content repository.

13. The computer program product of claim 12, wherein the query comprises at least one query selected from the group consisting of: a triple pattern; a disjunction; a conjunction; and an optional pattern.

14. The computer program product of claim 12, wherein the ontology is stored in a triplestore.

15. The computer program product of claim 12, wherein the ontology is stored in one or more tags associated with one or more content items in the content repository.

16. The computer program product of claim 12, wherein the content repository is associated with a social network.

17. The computer program product of claim 16, wherein the social network comprises an at least one collaboration mechanism from the group consisting of: a social structure of individuals and organizations; email; instant messaging; a wiki; a blog; media sharing; collaborative tagging and subject indexing; and an avatar-based virtual world.

18. A system for replicating a portion of a content repository comprising: a content repository to store a plurality of content items, wherein the content items comprise digital documents; a pattern recognition engine implemented via a processor, the pattern recognition engine comprising: a navigation monitor to monitor a usage pattern of the content repository, wherein the usage pattern describes usage of the digital documents in the content repository and logical relationships between the digital documents; a statistics generator to determine commonly accessed content items and commonly used ontological relationships for a class of user based on the logical relationships described by the usage pattern and a statistical analysis of the usage pattern; an ontology manager to determine ontological classes for the commonly accessed content items and to automatically generate a query for the commonly used ontological relationships; and an ontological graph builder to generate, in response to the query, an ontological graph of content items to replicate including a subset of the plurality of content items; and a replication engine to extract the identified content items and store the identified content items on a storage device separate from the content repository.

19. An apparatus for identifying a portion of a content repository for replication comprising: a navigation monitor to monitor a usage pattern of a content repository including a plurality of content items, wherein the content items comprise digital documents, wherein the usage pattern describes usage of the digital documents in the content repository and logical relationships between the digital documents; a statistics generator to determine commonly accessed content items and commonly used ontological relationships for a class of user based on the logical relationships described by the usage pattern and a statistical analysis of the usage pattern; an ontology manager to determine ontological classes for the commonly accessed content items and to automatically generate a query for the commonly used ontological relationships; and an ontological graph builder to generate, in response to the query, an ontological graph of content items to replicate to a storage device separate from the content repository including a subset of the plurality of content items.

* * * * *